(12) United States Patent
Mertens

(10) Patent No.: US 8,237,809 B2
(45) Date of Patent: Aug. 7, 2012

(54) IMAGING CAMERA PROCESSING UNIT AND METHOD

(75) Inventor: Mark Jozef Willem Mertens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1074 days.

(21) Appl. No.: 12/064,336

(22) PCT Filed: Aug. 16, 2006

(86) PCT No.: PCT/IB2006/052831
§ 371 (c)(1), (2), (4) Date: Feb. 21, 2008

(87) PCT Pub. No.: WO2007/023425
PCT Pub. Date: Mar. 1, 2007

(65) Prior Publication Data
US 2008/0303913 A1  Dec. 11, 2008

(30) Foreign Application Priority Data
Aug. 26, 2005 (EP) .................................. 05107835

(51) Int. Cl.
*H04N 5/228* (2006.01)
(52) U.S. Cl. ................................. 348/222.1; 348/221.1
(58) Field of Classification Search .................. None
See application file for complete search history.

(56) References Cited

U.S. PATENT DOCUMENTS

| | | | |
|---|---|---|---|
| 5,412,487 A | 5/1995 | Nishimura et al. | |
| 5,524,070 A * | 6/1996 | Shin et al. | 382/274 |
| 6,256,414 B1 | 7/2001 | Mancuso et al. | |
| 6,344,860 B1 * | 2/2002 | Watts | 715/765 |
| 7,034,881 B1 * | 4/2006 | Hyodo et al. | 348/333.12 |
| 7,057,645 B1 * | 6/2006 | Hara et al. | 348/208.6 |
| 2001/0022860 A1 | 9/2001 | Kitamura et al. | |
| 2001/0048753 A1 * | 12/2001 | Lee et al. | 382/103 |
| 2002/0034336 A1 * | 3/2002 | Shiota et al. | 382/274 |
| 2003/0025838 A1 * | 2/2003 | Kim | 348/678 |
| 2003/0189664 A1 | 10/2003 | Olsson | |
| 2004/0103111 A1 | 5/2004 | Miller et al. | |
| 2004/0205169 A1 * | 10/2004 | Machida | 709/220 |
| 2004/0207734 A1 * | 10/2004 | Horiuchi | 348/229.1 |
| 2004/0246360 A1 * | 12/2004 | Stavely et al. | 348/333.11 |
| 2005/0025357 A1 * | 2/2005 | Landwehr et al. | 382/170 |
| 2005/0083419 A1 * | 4/2005 | Honda et al. | 348/244 |
| 2007/0097228 A1 * | 5/2007 | Kuniba | 348/222.1 |

FOREIGN PATENT DOCUMENTS

| | | |
|---|---|---|
| EP | 0735753 A2 | 10/1996 |
| JP | 11136568 A | 5/1999 |

* cited by examiner

*Primary Examiner* — Jason Chan
*Assistant Examiner* — Yih-Sien Kao

(57) ABSTRACT

To allow much better user control of how a camera output image captures an original scene, the imaging camera unit (401), arranged to form part of a image-capturing camera system (400), includes a user-interface (420), allowing a user to specify at least one indication (gp) of a geometric position of an object (101) of his preference in a captured image (Io) received from an imaging sensor (406) via an input (403), a user-adaptable object segmentation unit (410), arranged to determine a set of pixels (sg) being part of the object (101), on the basis of the indication (gp), and a color composition monitor unit (412), arranged to determine at least one statistic (ST) on the basis of at least one color property of pixels in the set of pixels (sg).

18 Claims, 8 Drawing Sheets

Figure 1:
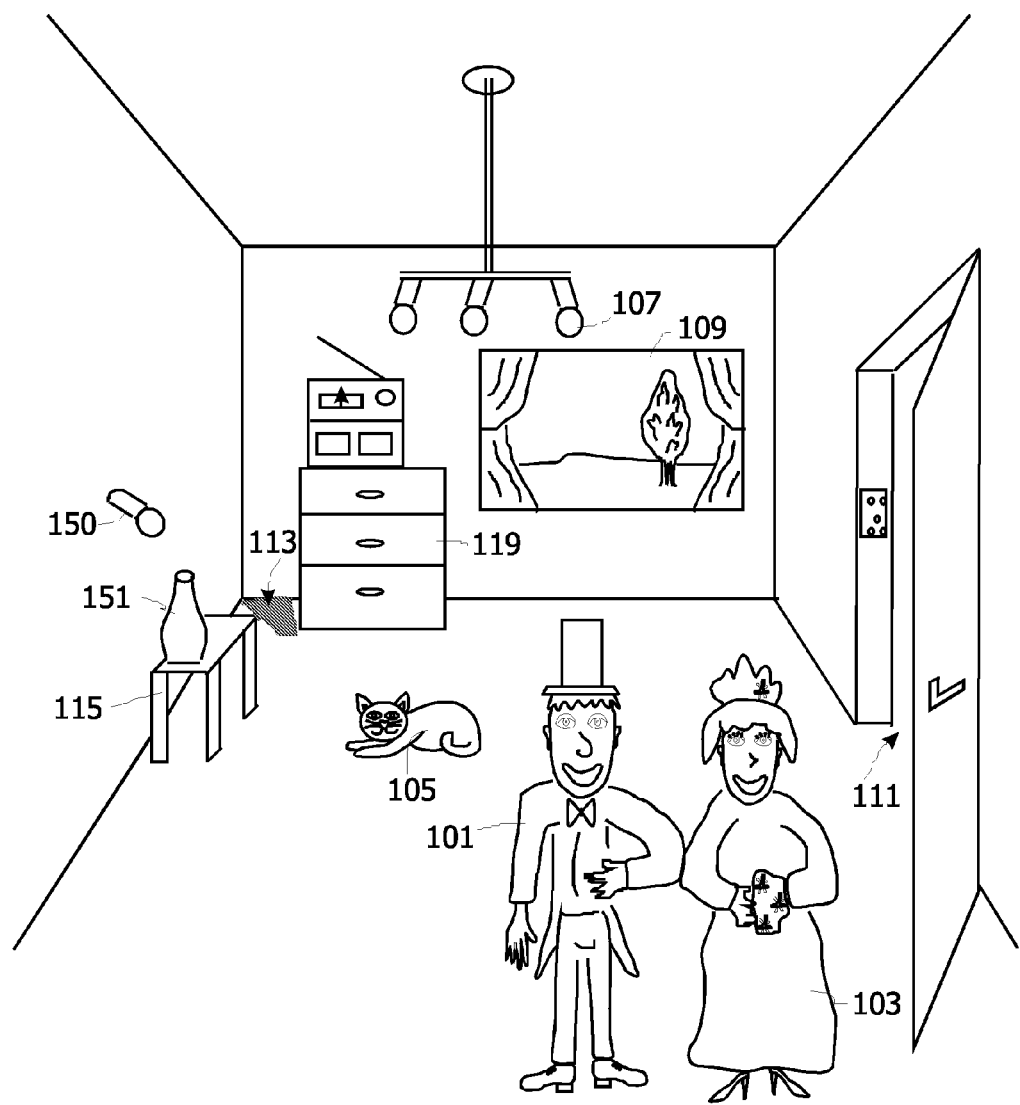

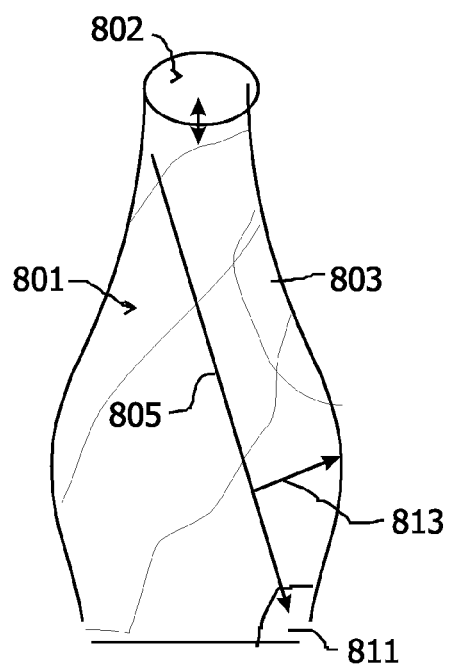 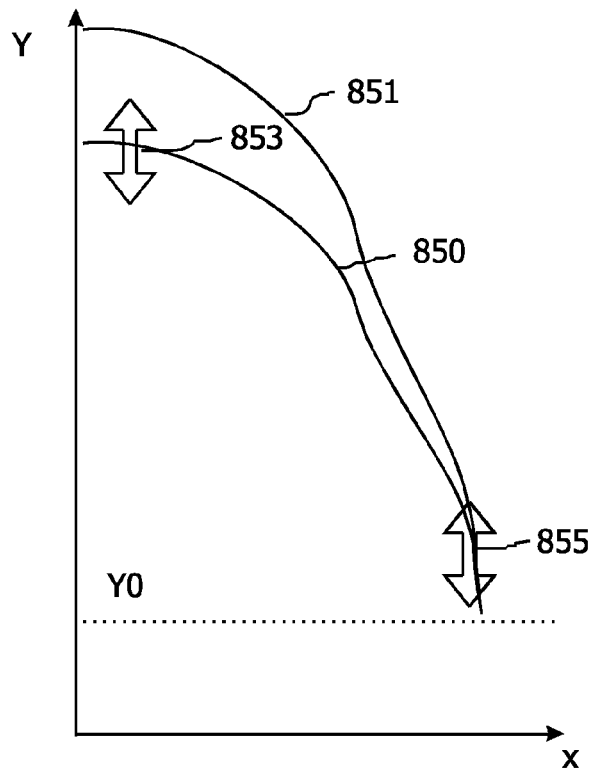
FIG. 8.1   FIG. 8.2

IMAGING CAMERA PROCESSING UNIT AND METHOD

The invention relates to an imaging camera unit for determining an optimal output image Is, or in other words, a optimal look of that image.

The invention also relates to a method for determining such an optimally looking output image in a camera, and a computer program product encoding the algorithmic steps of such a method.

Modern cameras take the tedious work of optimizing the image capturing following physical imaging principles out of the hand of the user, by providing (proprietary) automatic optimization procedures.

Sharpness optimization (automatic focusing) is an example of such an optimization. Sharpness is a good property to optimize, since it is very dependent on the physical properties of the lens system: in a normal camera, not all objects (depth planes) can be sharp, but, e.g., the central region to which the user points can be made sharp however (with simple physical and/or mathematical analysis, such as, e.g., looking at line spread), and usually this sufficiently corresponds to the user's desire. Actually, many users may, with modern cameras, get sharper pictures with the autofocus than with their manual focus, even under difficult automatic focusing conditions.

Another example of automatic optimization is auto-exposure, which frees the user from photo-measuring the scene and having to use conversion tables, in that the system knows what its behavior is.

It is however a disadvantage of these systems that practice shows that some captured images do not look as nice as they could, or even that some images look plain ugly (this is particularly illustrated with a camera panning across a cityscape, whereby the buildings may become unrecognizable when rendered on a low dynamic range display for pictures in which a lot of sky was imaged).

According to the inventor, automatic exposure is even fundamentally non-desirable: unlike a simply optimizable property as the sharpness, the color compensation of a scene, is a property which is an artistic quality of the picture, just like its geometric composition, i.e., for which a technical system should exist to influence it, but preferably in a not to tedious way.

Therefore, it is desirable to have a technology that offers to a user increased control over the image he captures, in particular, that he has already a number of editing, and image-improvement facilities somewhat similar to what is possible in PC photo-editing software, since it is, at the time of capturing, that the user still has full control over what is to be captured and how (e.g., the amount of noise on the pixels), but later on, there may be irreparable data loss between the original 3D scene and the particular photographic representation. Furthermore, the user, probably already during capturing, can decide how he wants to "optimally" store the picture for later use, and many of the actual capturing parameters, such as pixel luminances, may be further changeable ("correctable") later anyway if still required, as long as care was taken that the information was captured well (e.g., no loss-of-detail clipping in the black).

This is facilitated by an imaging camera unit ($401$), arranged to form part of a image-capturing camera system ($400$), comprising:

a user-interface ($420$), allowing a user to specify at least one indication (gp) of a geometric position of an object ($101$) of his preference in a captured image (Io) received from an imaging sensor ($406$) via an input ($403$);

a user-adaptable object segmentation unit ($410$), arranged to determine a set of pixels (sg) being part of the object ($101$), on the basis of the indication (gp); and a color composition monitor unit ($412$), arranged to determine at least one statistic (ST) on the basis of at least one color property of pixels in the set of pixels (sg).

The human visual system looks at scenes and objects in a scene in a totally different way than a camera. Not only are most current cameras linear (e.g., CCDs; at least as the sensor is concerned, and not the inverse gamma characteristic applied to obtain a output image signal), whereas the human visual system is non-linear (e.g., more luminances can be captured in the same range, e.g., 0-255), with a non-linear function which is adaptable depending on the scene conditions (e.g., average luminance). The human visual system is also highly (intelligently) adaptable. A camera taking a picture of a car in the sun, may yield an image with severe shadows on the car, which shadows may become objectionable to a viewer in a viewing environment, without the knowledge of the original capturing conditions. A human will tend to see the entire object as "a car" and may not even notice the shadows (i.e., the brain "corrects" them so that they become less conspicuous).

Even for a complex object such as a silver Christmas ball reflecting all kinds of surround colors on its surface, a human can still reasonably determine the color of the Christmas ball.

According to this invention, a difficult part of what the human visual system needs to do to arrive at the above described "correct scene representation images" (by this we mean an image more appropriate for off-line human viewing, i.e., not with harsh shadows etc.—and in particular not too many clipped colors—, i.e., a little bit like a painter would draw the image—giving a human realistic effect: i.e., e.g., the car picture with less dark shadows, and perhaps also the bright sun illumination compensated), namely the understanding of the scene, and its most relevant objects, and their relationships, is taken care of by the manual indication part of the segmentation. That is, the invention offers a good characterization of the scene, as at least one important object of it, for further analysis, which enables more intelligent camera algorithms.

An embodiment of the imaging camera unit ($401$) comprises a capturing optimization unit ($424$), arranged to optimize at least one capturing parameter (cp) for capturing at least one further image.

The automatic part of the image processing (changing the capturing parameters of the sensor, such as, e.g., exposure duration, or post-processing the outputted sensor-captured image, such as applying a color modification) can then be relatively simple for the user, and will typically involve the cumbersome mathematical processing based on the physical reality of the scene, which a human is not good at, and does not like to do (such as determining optimal exposure based on, e.g., statistical measures of the colors of the pixels in the different image objects selected by the user). But the optimization is done on the basis of a much increased control over the important content in the scene compared to existing capturing optimization systems. The capturing parameter (cp) can be one or several of, e.g., shutter speed, aperture, amplification factor, contrast adjustment, color temperature correction, and color cast removal.

Another, possibly cumulative, embodiment imaging camera unit comprises an object transformation unit ($414$), arranged to apply a transformation to the at least one color property of the pixels in the set of pixels (sg), based on a specification (sp) of a user supplied to the object transformation unit ($414$) via a transformation interface unit ($450$).

Therewith, the user has a further control to make to scene objects look the most harmonious according to his desire (and given physical limitations), either with or without the need to capture further pictures (i.e., on the basis of whatever—possibly already recomposed—image, or set of images with additional data, currently present in memory).

In one of the simpler variants, the grey value range is modifiable, e.g., via a composition picture (601) showing the ranges of set of pixels of at least some of the user-selected and background objects in the captured image (Io) in relation to each other.

It is advantageous if the imaging camera unit (401) comprises a spatial modification unit (416) arranged to modify a geometrical profile of the at least one color property of the set of pixels (sg) of the object (101) on the basis of a user specification (spp).

Although for many images, range redistribution will be sufficient to the user, this does not provide to him enough control for other types of image, e.g., an image in which a small part of the scene is over-illuminated, and possibly in a geometrically dependent way, e.g., some part of the object is very close to the illuminant, whereas another part is in the shadows.

The user could then shift the range, but this would not help him as clipped-to-white pixels would become clipped-to-grey pixels, and the contrast across the object may still be too large to be harmonious according to the user's desire. He may want to specify, e.g., a smoother evolving color profile.

It is even more advantageous if the imaging camera unit (401) comprises a status determining unit (415) arranged to determine depending on a final image (Is) look determined by the user, i.e., e.g., to which position he shifts an object range, whether capturing of a further image is required, e.g., because the object was captured with a lot of noise. The camera can then automatically capture another image, and fill the object therefrom, or simply attend the user to the fact and request him to take at least one other image.

Many embodiments of the segmentation part fall within the scope of the claims, e.g., the imaging camera unit (401) user interface may be arranged so that the at least one indication (gp) of a geometric position of the object (101) comprises a specification of an outline of the object (101).

In the future more people will use differently named devices which act as cameras.

Equivalent to the imaging camera unit is a method of determining, in a camera (400), at least one statistic (ST) of at least one color property of pixels of an object (101) in a picture (Io) captured by an imaging sensor (406) of the camera, comprising:

allowing a user to specify at least one indication (gp) of a geometric position of the object (101) of his preference in the captured image (Io);

determining a set of pixels (sg) being part of the object (101), on the basis of the indication (gp); and determining the at least one statistic (ST) on the basis of the at least one color property of pixels in the set of pixels (sg).

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential.

Figure 2:
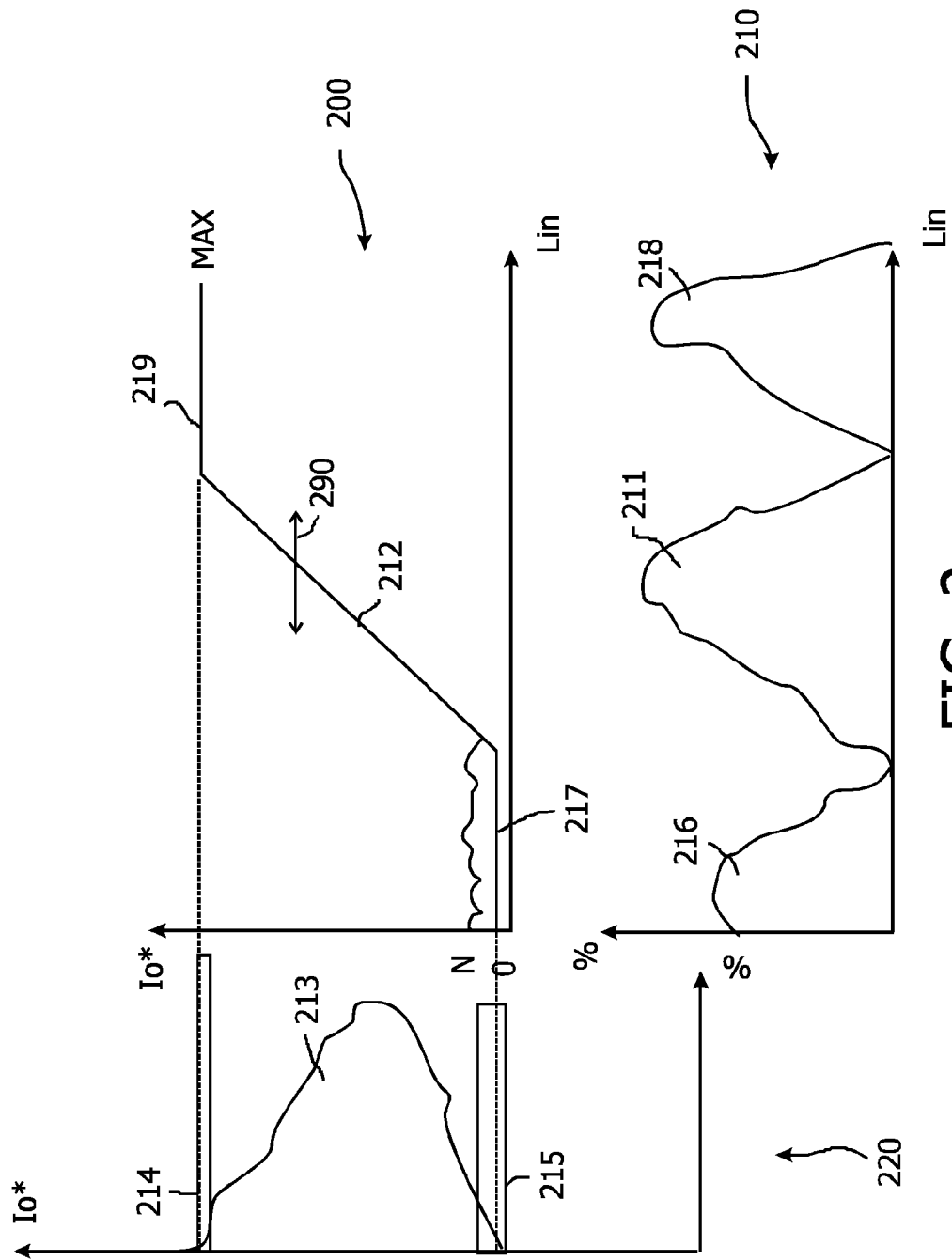
Figure 3:
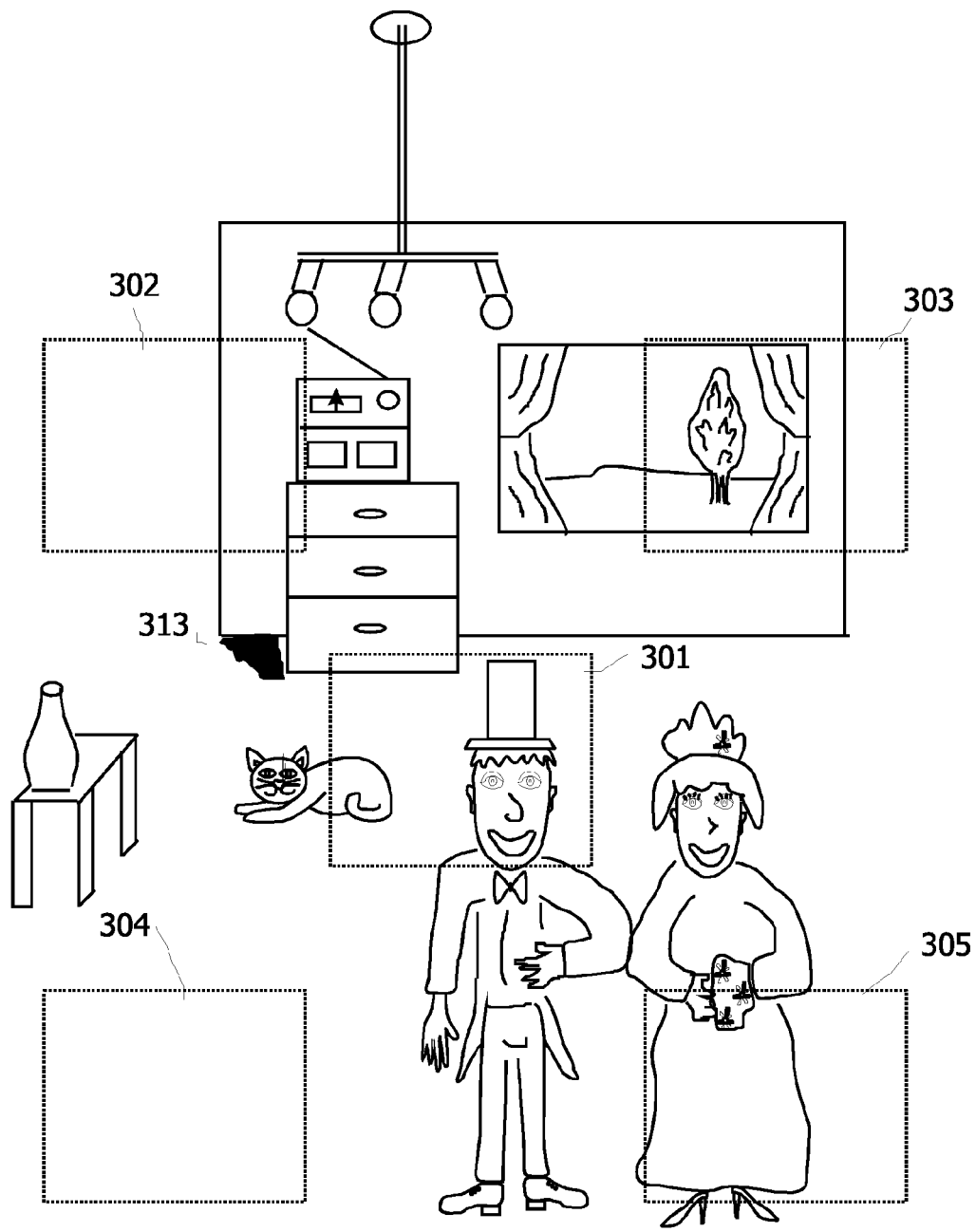
Figure 4:
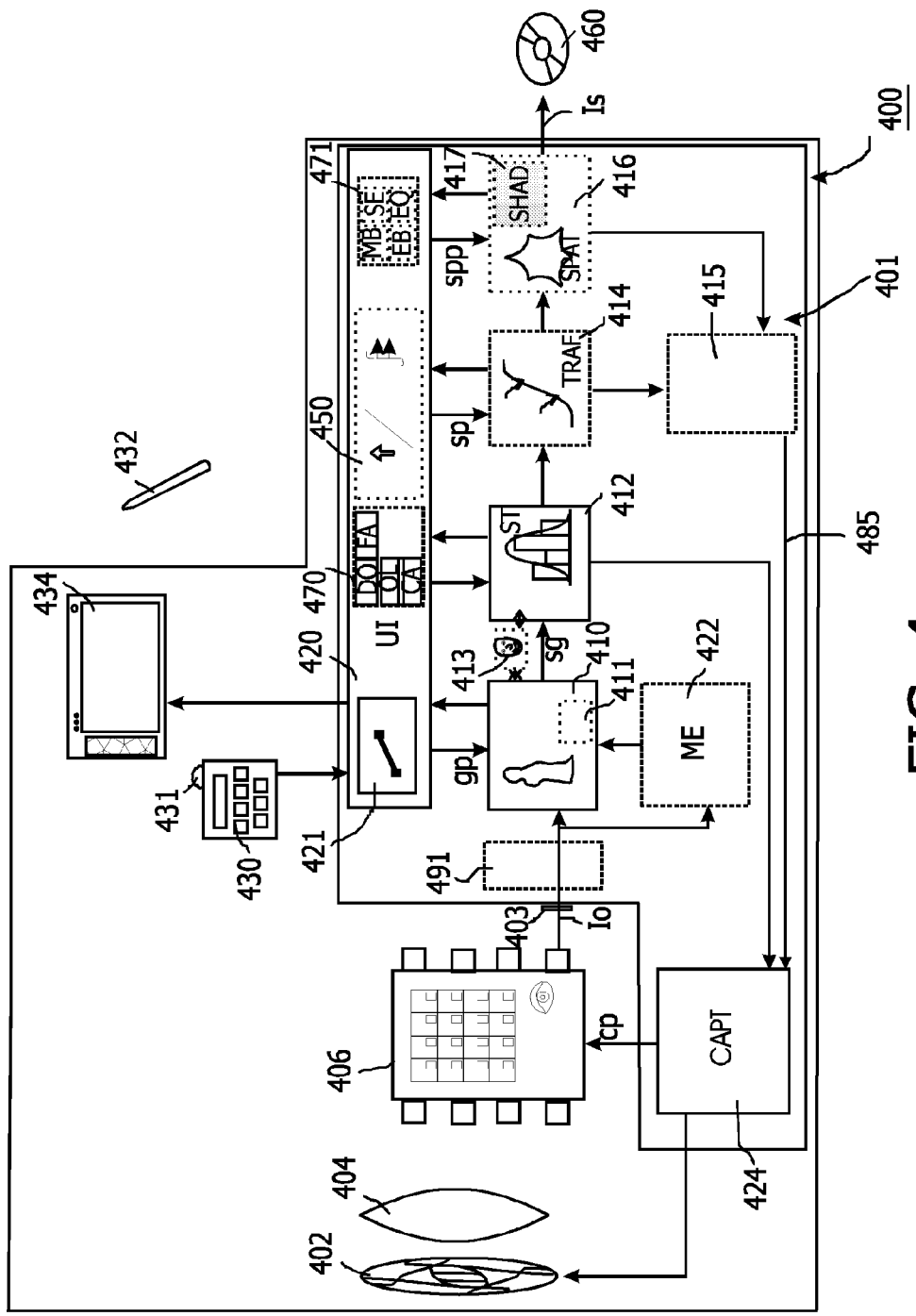
Figure 5:
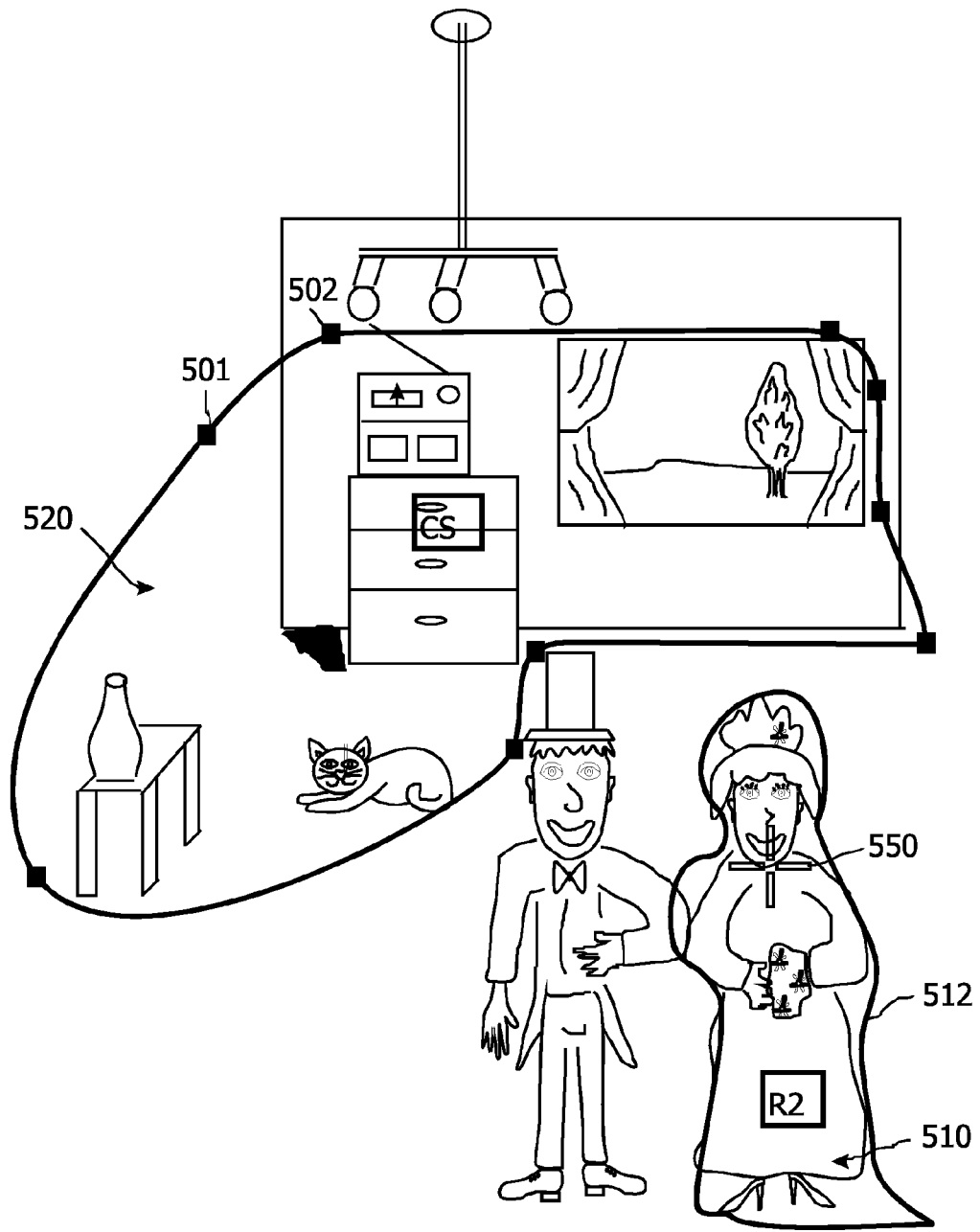
Figure 6:
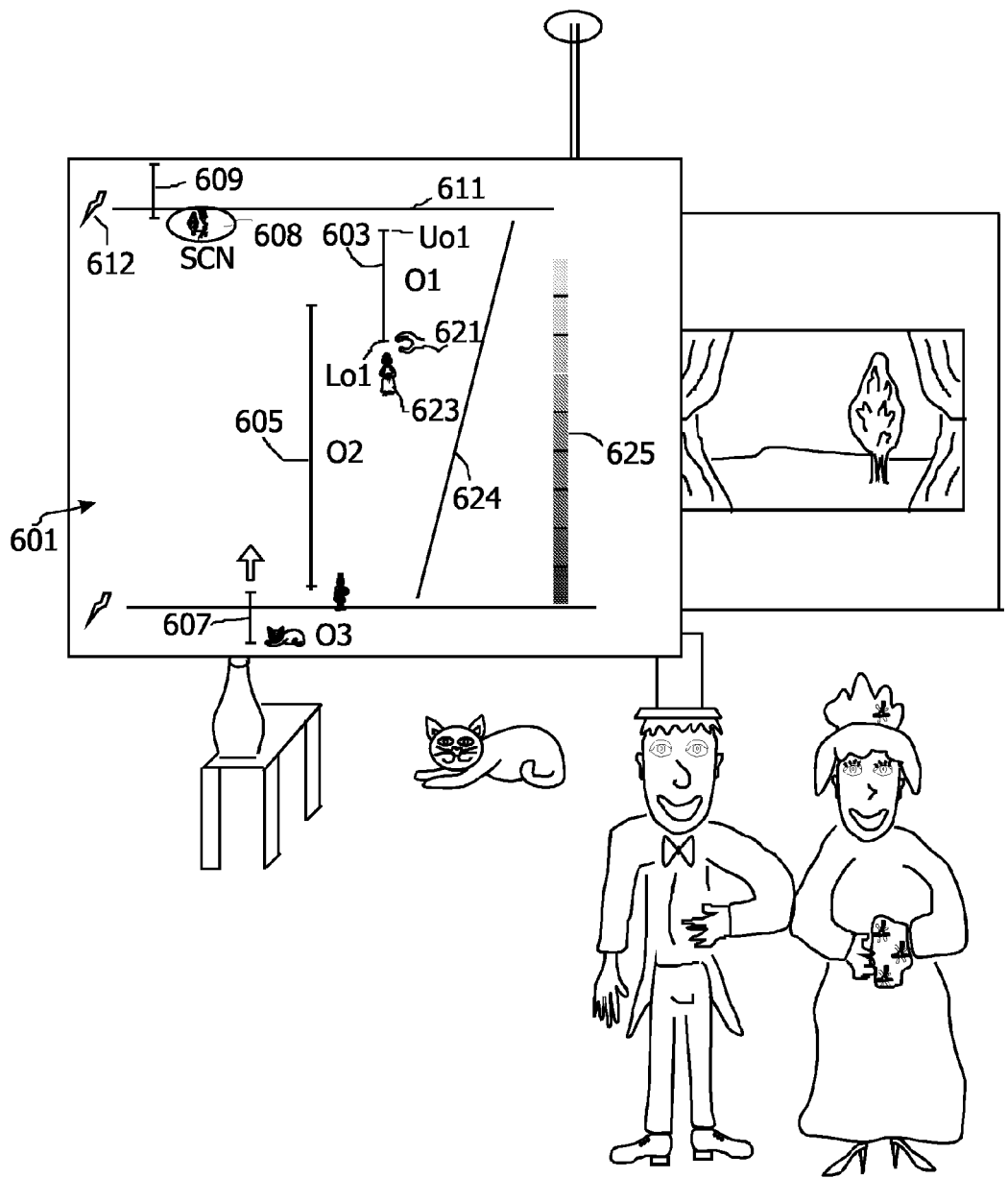
Figure 7:
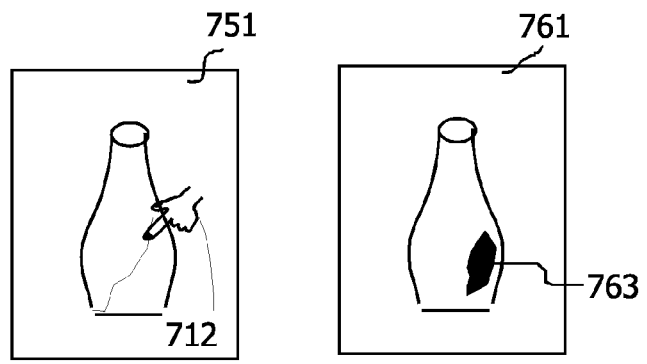
Figure 7:
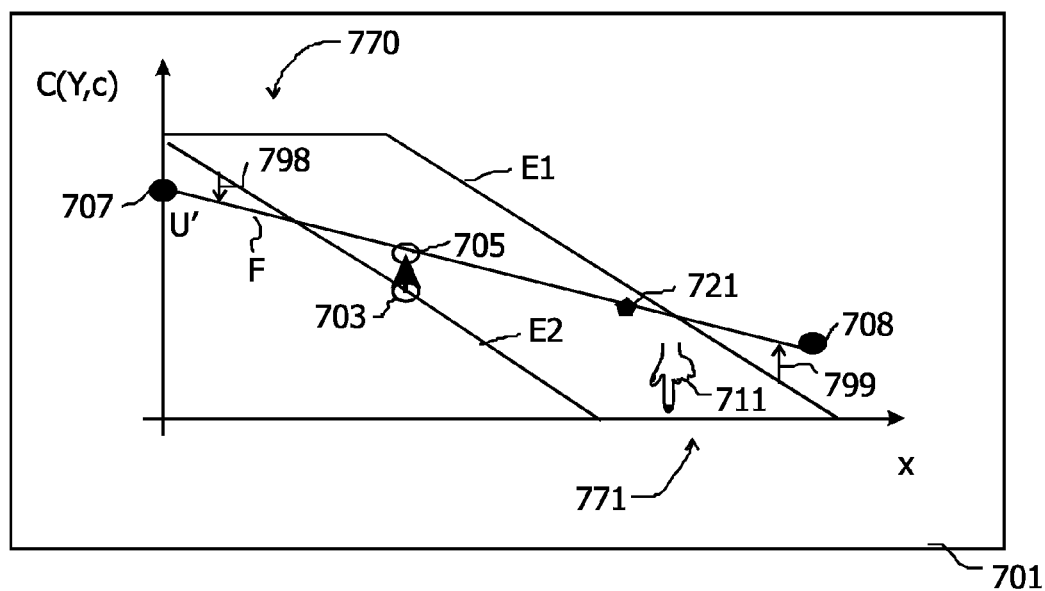

In the drawings:

FIG. 1 schematically shows a scene for photographing;

FIG. 2 schematically shows a gamut of an electronic image sensor;

FIG. 3 schematically shows a captured image, and a prior art exposure optimization;

FIG. 4 schematically shows a camera comprising an accumulation of different embodiments of the present invention;

FIG. 5 schematically shows what a user interface would allow a user to segment objects;

FIG. 6 schematically shows an interface for mapping object color ranges to the final image to be output;

FIG. 7 schematically shows an interface for applying a spatial color profile to an segmented object; and FIG. 8 schematically shows how to increase a shadow effect.

FIG. 1 shows a scene notorious for its difficulties for photographers, namely, a marriage scene (and which scene may contain both indoor and outdoor parts). The groom 101 has a black suit, i.e., typically leading to dark colors, and the bride 103 has a white gown, which also has to be reproduced faithfully. In principle, when the scene is optimally illuminated (something which at least amateur photographers seldom take care of), there should be no problem. Blacks typically reflect a couple percents of the light falling upon it, and whites may have around 90-95% reflection. So the scene contrast ratio could be about 100/1. Still to be defined is what the unit (the 1) needs to be, i.e., how small a grey value difference the camera should still record.

A typical—perhaps somewhat conservative—value is that humans perceive luminance differences of 2%, which leads to a reflection between 1 and 95% to a required amount of 230 codes (or 8 bit). For an equivalent linear system however, 4700 codes (13 bit=8192 codes) would be required, to encode steps which are as large as the smallest 2% perceivable step for the 1% reflecting black, which difference immediately illustrates the effect of non-linearities (such as applying an inverse gamma to the captured data before storage or transmission).

This 100/1 range should not be too problematic for many digital cameras, which may have, e.g., a total noise (sensor+ electronics, such as D/A converter) of 15 electrons and a well-depth of, e.g., 85000 electrons, resulting in a contrast ratio of 5700 (density=3.75 or 13 bit), even if such a well-illuminated scene is captured with a little too much or too little exposure (the automatic exposure of the camera should take care of that).

However, typical scenes can add, on top of the reflection by objects, a severe variation in illumination. E.g., a lamp 1 meter above a surface generates only a tenth of the illuminance 3 meters further along the surface, making the scene contrast ratio already 1000:1.

In typical indoor scenes, there may be many shadows 113, sometimes severe if they are in another room. It may be that the user wants to see these other room regions as shadowy (i.e., without internal object structures), but he may want to see some of the information in the other room (as he can with his human visual system being on the scene), or at least have some information so that he could do later post-processing. On the other end, there is the high illuminance from (sunny) outdoor objects 109, or light sources 107, or specular reflections of light sources.

Another possible problem is formed by objects—such as object 151—which are too close to a strong light source 150, e.g., specifically illuminated in an exposition. These objects may be over-illuminated and lose their characteristic chromaticity, at least over a part of the object.

In outdoor scenes the effect may even be worse. Sunny pictures with shadowed parts may be too contrasty to the consumer's liking (in particular when viewed on a display on which the contrast and colorfulness is also boosted), and indoor parts (e.g., the interior of a garage of which the door is open) may be under-illuminated in the total scene, leaving the contents rather invisible, which cannot be post-corrected by photo manipulation, since the data was not stored in the captured image.

Real scenes may have a contrast ratio of, e.g., 3000:1, which would require (for 2% human visual sensitivity requiring already 150,000 distinguishable sensor output codes), and that is more challenging with present cameras and a typical user.

This is experienced by the user of a typical digital camera having a histogram function, as schematically illustrated in FIG. 2, which shows a histogram of the scene luminances 210 and a histogram of the captured digital values 220 (Io*) by the sensor, versus the transfer characteristic 200 of the sensor. Note that also in a camera, the transfer characteristic 200 is adaptable (arrow 290) by changing, e.g., the shutter speed.

Scene object luminances 211 along the linear part 212 of the transfer characteristic 200 are reasonably imaged to luminances 213 (there are still color errors due to the non-ideal camera color filters though).

But for many of the images the user wants to capture, a considerable proportion of the darker parts 217 (lower object luminance Lin) of the scene 216 is mapped to the minimum code values 215 of the sensor, resulting in a loss of detail (also called clipping, or blown-out) in the dark parts, e.g. the parts of the groom's suit which are also badly illuminated. E.g. a CCD needs at least one electron for each pixel, so anything less would also give a zero output code, but in reality there is always noise N, so the lowest code values of the scene are not really representative for the scene, rather they may be very objectionable to the user in cameras having much noise. On the high scene object luminance side 218 a similar thing happens: since the camera has a maximum value MAX 219, all higher luminances are mapped to the same value, e.g. 214. This loss of detail is seen in e.g. white flowers, or strongly illuminated parts of the bride's gown. Higher luminances do cause photo-electrons, and may even cause the annoying artifact blooming, but all that is typically above the maximum value.

Another similar artifact is the discoloration and desaturation of objects under strong illumination. Also, skies may look very pale-ish blue (the blue channel saturation, but the red and green also becoming high, adding anti-blue).

The user may see in the histogram window from the many overflow and underflow values, that his capturing was incorrect (and this may have been so with the automatic optimization of the camera set to ON), but he may not be able to take the appropriate action. Even a knowledgeable user may be left with choosing between several bad automatic optimizations. Furthermore, cameras have become so popular lately—popping up in all kinds of portable apparatuses like, e.g., mobile phones—that many typical users will not have the knowledge of a classical photographer with a photometer, yet still they desire beautiful pictures.

There is continuous development to get better dynamic range capturing of scenes in cameras, such as bracketing (in which, from a number of consecutive images taken with different exposure values, the well-imaged regions are merged), or double-pixel sensors (with a large, sensitive, and small, less sensitive co-located pixel), but the user has little influence on the fixed algorithms that are used, and what influence he has, are the difficult different options of luminance measurement.

Electronic exposure typically looks at luminances in the scene (or under approximate linearity the (R, G, B) values of the pixels captured), and based on an "average" illumination, sets the capturing parameters (e.g., shutter speed, etc.).

This is a good model of physical reality: as described above, objects reflect between about 0.5% and 99%, and this is multiplicative irrespective of the (outside) illumination, which may vary over more than 7 magnitudes (e.g., 100 000 1× outside in summer). So, just like the human visual system shifts its response curve with the available illumination (due to cone photochemistry, cone-opsin bleaching, neural adaptation, etc.), a camera can do the same by varying aperture, shutter time, and amplification.

However, if the scene gamut (e.g., the luminances) is greater than the gamut of the color representation space (e.g., PAL, JPEG) there is another problem with the illumination measurement, in that it may be the wrong average, leading, e.g., to the darker regions being unrepresentable. In this text we will deal with two gamuts:

the gamut of the sensor, i.e., taking into account noise, well-depth, and the capturing parameters, such as shutter speed, which colors can be faithfully represented (by first being optimally imaged), and which will map to existing codes (non-inversible double allocation, called clipping);

the gamut of the color representation space (it may be necessary to apply a further gamut mapping, which may be partially reversible to later obtain a larger gamut to be displayed; according to the invention this mapping is preferably also intelligent, i.e., under control of the user).

Hence according to the present invention, the user has optimal control (for user-optimized pictures) over the capturing, and the final rendering (e.g., for a "theoretical" display, so the final mapping needs to be done only once, preferably in-camera, as in the present invention).

If the sensor has an infinite (perfect) gamut, there would still be a problem if we have to gamut map the sensor output to too small a representation space (e.g., where classical wet photography has found a reasonably nice way of dealing with highlights, electronic photography has not), even when the gamma approaches that of the human visual system (and often there are gamma mismatches, making the problem more severe).

We do not deal in this text with the gamut of the output device, such as a television display or newspaper print. We assume that given a reasonable color representation, an optimal gamut mapping towards the display gamut can be done at the display's side, taking into account the physics of the display and the viewing environment (e.g., a television typically has a contrast ratio of about 50:1, or even less when viewed during the day, hence, a brightening of the blacks is desirable).

FIG. 3 shows an image as it would be captured. Note the change in geometry compared to the original scene: this will lead to the fact that in some positions of the camera in the scene, some regions of the image may be badly imaged as the illumination of the sensor is geometry dependent (too light or too dark, e.g., darkened shadow 313). Note that a certain degree of shadowing is also required for giving the scene the correct 3D impression, but a photographer/artist would want to apply light effects reasonable independent of the required capturing physics (and the present invention of controlling the capturing such as pixel luminances allows at the same time/user action to control the shadows, hence, post-check/correct the 3D appearance).

A typical camera exposure algorithm would measure the luminances in a couple of regions 301, ..., 305, and calculate a luminance distribution measure. The user typically has control over the central region 301 position, but the other regions are then fixed in size and position (and give an overall good indication of the illumination of the scene). However, important objects like bride 103 may only be partially sampled (in this case not even her face, which is probably the most important region), and on the other hand, the regions may sample outlier values, such as region 303 sampling light from outside objects. This will, due to its high pixel luminances, greatly contribute to the total scene luminance measurement, lowering the exposure, making the important objects, such as the couple's faces, typically too dark, compared to the user's desire (and the darkest regions becoming noise solely). What the user would like is that the outside pixels could be treated separately, and also given some user-chosen value (probably not even important which one: it should be a light part in the scene, and harmonious in pixel luminance with the rest of the scene, i.e., at least not clipping/blooming, and with washed-out colors as currently in a number of cameras).

Perhaps specific less important objects like a cat 105 should blend in with the rest of the background scene (objects 115 and 119), i.e., be reasonably recognizable (of similar but different enough luminance compared to the surrounding background), and preferably harmoniously imaged.

Alternatively, the user may decide to have better control over its color representation too.

Another possibility of prior art cameras is measuring the luminance of a certain (difficult or important) spot and capturing the image taking this into account, but then again the resulting image of the entire scene is dependent on this single measurement.

In any case, be it due to hardware/software limitations, or the inexperience of the user, contemporary cameras are not that easy for obtaining harmonious, human vision-like images (leading to further problems when rendering these images under different viewing environments). What a user would desire is a way of arriving at the correct colors with a technology which is as easy as geometric manipulation (humans are very skilled in analyzing/composing the geometric content of an image, e.g., even the most experienced amateur may arrange the couple to stand in front of a beautiful spot in the room—although the light leaking through the window there may destroy his photo—in a particular pose and order between all people).

The present invention does not fully dispense with good lighting, and, of course, intelligent lighting is half of photography, but the immediate interaction allows a user to see immediately what the best results—according to their preference—can look like, and he can then decide whether it is still desirable, or even necessary, to adjust the lighting or scene, or where and how he should recapture the image. On the other hand, the simplest embodiments don't necessitate much extra user interaction, which is desirable, e.g., for quick holiday capturing.

FIG. 4 shows a camera 400 comprising a number of different embodiment options of the image processing imaging camera unit 401 (e.g., a dedicated ASIC, or a part thereof, or software running on a generic processor) according to the present invention.

A typically semi-automatic object segmentation unit 410 is included, which is arranged to select objects in an image Io captured by an imaging sensor 406 (connected to the imaging camera unit 401 via an input 403, such as a digital data bus) such as a CCD or CMOS, such as the groom 101, based on at least one indication gp of a geometric position of the objects (e.g., clicking within a automatically determined segment, or preferably before an automatic segmentation part) by the user (i.e., user-adaptable).

The at least one segmented object (i.e., a set of pixels sg and their values) is input for a color composition monitor unit 412, which analyzes the colors of the pixels within the object. E.g., it may derive the average luminance or an amount of outlier colors, or any spatial statistic ST of the object colors.

Two sets of parameters may be changed (either one separate or both) with the imaging camera unit of the present invention: the capturing parameters, and the mapping parameters to the color representation output image Is, to be stored on a memory 460 (e.g., a disk, in-camera solid state memory, ...), or transported over any network.

The capturing parameters are calculated by a capturing optimization unit 424. This unit 424 may be arranged so simply as for deriving any pixel-histogram based exposure value (getting as input statistical properties from the color composition monitor unit 412), but now, instead of a classical camera based upon a fixed part of the entire image, based upon colors of the segmented pixels of at least one important object (e.g., for the groom 101, or the set of two objects bride 103+groom 101; the exposure is, e.g., determined so that they map to a midrange of the linear part of the CCD). It may, however, also take into account the capabilities of the camera, e.g., if the camera enables bracketing, instead of capturing two images with a fixed number of stops in between, according to the present invention, the capturing optimization unit 424 is arranged to capture a first image with an optimal exposure for the first user-selected object (the groom) and a second image with an optimal exposure for the second user-selected object (the bride), and perhaps a third one for the surroundings in the scene, if an optimal image cannot, according to the user's preferences, be derived from these two capturings. E.g., the color composition monitor unit 412 may be arranged to calculate optimal parameters for all parts of the scene not comprising the at least one segmented important object, and if necessary (depending on how the colors of the surround after possible transformation would fit) for intelligent object-based bracketing, capture a second image for the surround.

The capturing optimization unit 424 will then, e.g., set the shutter 402 opening time (404 is a lens).

If the user only controls the capturing parameters, the object segmentation performed by object segmentation unit 410 need not be perfect (i.e., not pixel accurate, there may be some background pixels sticking to the bride, and some parts of her gown may be missing in the selected object region—which relaxes the complexity requirements of the object segmentation algorithm, and saves calculations), but it should be better than just a fixed region selecting whatever of the bride (not even her head). Because the segmentation is semi-automatic (i.e., a mix of image processing and user selection/correction of the automatically obtained region), and the result of the segmentation can be seen by, e.g., drawing boundary curves on top of the captured image (by means of a second image buffer), the user can correct if not enough, or uninteresting parts of the bride are selected (e.g., by clicking on adjacent—possibly over-segmented—segments to connect or disconnect them to the bride object).

Semi-automatic segmentation is always the best way of segmentation, leaving the most difficult part of scene understanding, or at least the minimal requirement of the user indicating what he finds most important in the scene, to the user, and the tedious work of pixel collection to the apparatus.

It is an optimization between quality and time invested. For the highest quality, but most operations, a user-interface 420 and object selection module 421 allows a user to accurately draw a contour around the object, e.g., with a stylus 432 for touching the display 434 of the camera. This may be desirable by user in their home environment or professional photographers with a tripod taking care of accurate capturing of a scene (although it is less desirable on holiday, when one quickly wants to take a couple of shots).

In case the user wants to influence the rendering to the output image Is (i.e., the way pixel values captured by the sensor are converted to final sensor values, to be output in, e.g., a JPEG or OpenEXR file), he typically may want an accurate segmentation.

For this contour drawing case, the object segmentation unit 410 segmentation algorithm is simply a derivation of the pixels interior to the drawn boundary (known per se in computer graphics).

But typically, the object segmentation unit 410 and user interface 420 are arranged to offer the user various less labor-intensive semi-automatic segmentation modes. The object selection module 421 may be arranged to give the user the option of a number of boundary drawing options, e.g., continuously, or by marking a few points to be connected. An example of how the user interface 420 may be arranged to render the selecting on top of a currently captured image is shown in FIG. 5.

The bride was selected, and the semi-automatically obtained object region 510 was drawn as a contour 512 on top of the bride. Also an example is given of delineating a region by clicking points 501, 502, etc., which may be connected by the algorithm of the object selection module 421 by linear lines, splines, etc. In the example, a rough surround region 520 (marked by the user interface with the code CS) is selected by the user so that it comprises a little bit of all the surround colors (dark corner, furniture, outside), i.e., a rough selection of what the user thinks is typical or important in the scene background. Preferably, the outside is selected as a separate region so that it does not influence the capturing and/or rendering of the other pixels.

Starting from points around the object of desire (e.g., a rectangle around it, which can be drawn even with the simplest user interface buttons: e.g., the turning wheel 431 on the interface 430 on the back of the camera may be used to position a cursor 550 to a upper-left corner of the surrounding rectangle and then to the bottom-right corner), the automatic part of the segmentation may form a better fitting object segment, by looking at such properties as grey value, color, texture patterns, etc., as are well-known from prior art image processing segmentation. For example, mathematical snakes may be used to lock themselves to the boundary (note that we use segments, being 2D sets of pixels, and boundaries, being 1D sets surrounding segments, interchangeably in this text, as the skilled person will know how to implement an equivalent algorithm with either or both of them) of the objects. For example, the bride and the groom as difficult, outlier grey value objects, may differ a lot from their surroundings, even only in grey value, without the need to check for specific texture template patterns.

Alternatively, the manual part may be as simple as clicking inside the object (e.g., positioning the cursor 550 at least in the face of the bride) and correcting, if necessary, the automatically segmented object on the basis of the user-indication click position. The interface may, e.g., present an over-segmentation of bride-object segments, which the user can then collect into a final object by clicking on them (e.g., with the stylus 432).

Because, ideally, one wants objects rather than constant grey value segments (e.g., adding more of the same grey value pixels to the automatic exposure algorithm doesn't give the full impact of obtaining a most appropriate exposure, and for the rendering mapping one would like to have as much as possible real objects), it is advantageous to incorporate a motion-estimation unit 422 (or a similar region—e.g., block—correlation unit) in the imaging camera unit 401, the output of which (e.g., segments with equal motion) can be used by the object segmentation unit 410, directly for generating object segments (all pixels having the same motion at the present time instant or over a number of pictures as the cursor clicked pixels in the present image), or as an input for a further refined algorithm (such as, e.g., color-based mathematical snakes fine-tuning the block-accuracy motion-based segmentation to become pixel-precise). This motion-estimation unit 422 may already be present in the camera for other reasons, e.g., temporal up-conversion in motion video cameras, or image stabilization, etc.

Advantageously, the motion estimation unit 422 is arranged to derive measures of micro-motion of humans over previous time frames spanning a number of seconds.

Also it is advantageous if the motion estimation unit 422 is arranged to derive on the basis of the motion parallax different depths, so that, e.g., the outside objects 109 are easily segmented.

Optionally, a segment tracking module 411 may also be included. It is arranged to track segments from the first captured image (upon which the segmentation was done by the user) to the second captured image with optimized capturing parameters, to account for camera movement in between, although this is not strictly necessary (when, e.g., only changing capturing parameters), since the camera will be in approximately the same position, looking at approximately the same scene (the statistics already having been calculated on the captured image), so the optimized capturing parameters will still be valid. But the re-determination of the user-preferred object segments is useful when the user wants to apply an optimized rendering too, as double user interaction is avoided, and better multi-picture composition can be achieved.

Advantageously, the segment tracking module 411 is further arranged to take into account the information of the moving objects for the later semi-automatic segmentation. For example, histograms may be collected from objects that were previously moving around like persons walking towards their places (in a video camera this may be meta-output, like, e.g., time series of the segmented object sub-pictures plus statistical color descriptors thereof, alongside the past recording of the event, e.g., the past ten seconds, whereas a still camera may, e.g., pre-scan the scene—e.g., on a lower resolution, quality, etc. to save battery power—even before the user really decides to capture the image), may be stored, especially if the regions have particular sizes, or have extreme luminance values (more dark or light than average, so potentially problematic).

A face detector 413 may also be included for giving input in deciding which histograms of moving regions will need to be stored for later usage, since humans are typically the most interesting for photographers. The face detector may be arranged to employ an algorithm based on values of pixel colors, and/or geometrical relations between the face region components (e.g., inter-eye, nose distances), etc., and face detectors are known per se.

The camera user interface 420 has an analysis mode control unit, which allows the user to select a number of optimization programs, e.g., via the turning wheel 431. When the mode is set to FA, the object segmentation unit 410 and/or the color composition monitor unit 412 are (e.g., by applying different software) configured to look for segments comprising faces, respectively make sure that a—possibly heavier weighed—contribution of face pixels is present in the color composition statistics ST.

Having this histogram pre-stored as probably an interesting object aids in the subsequent segmentation: pattern recognition techniques can be used to allow identifying which histogram is closest to the object selected by the user in the image to be optimally captured, and the segmentation can take the content of the histogram into account (e.g., sub-segments corresponding to subparts of the color or texture histogram need to be present in the currently segmented object, unless they have become occluded), in addition to the geometric mapping of the motion-estimation obtained region by the segment tracking module 411, as described above.

In an addition or alternative to the user-controlled object-based optimization of the capturing, as said above the imaging camera unit 401 may be arranged to allow the user to modify the mapping parameters to the final image to be output Is (respectively its representation space) to arrive at a pleasing final composition.

Thereto, an object transformation unit 414 may be included, which is arranged to apply modification of the pixel colors (by which we mean its luminance and or its chromaticity, or similar pixel color representation parameters), i.e., re-position the colors of the object relative to its surround (whereby the surround (the rest of the image or a spatial vicinity of the object) color may stay the same or partially follow the selected object colors), under the control of a transformation interface unit, which is arranged to offer the user an option to change color parameters to his liking.

An example of such a transformation interface is symbolically shown (what a user gets to see on the camera display 434) in FIG. 6. It is, of course, understood that this Figure is merely used to disclose the technical components required for the user interaction with the object transformation unit, and other interfaces with similar technical possibilities are possible to design.

Segmented objects are advantageously described mathematically with two kinds of descriptor, namely, the first being simply a range (being the extent of its darkest to its lightest pixel, or a subregion thereof, eliminating some outlier pixels based on particular predefined criteria, e.g., pixel noise), and the second being a spatial profile of the pixel colors (which is ideally two-dimensional, but for a simple interface, a 1 dimensional summary may be generated, based upon a predetermined algorithm). It is to be noted that where we say color, this may be simply a luminance, or another color measure (e.g., a saturated red object having de-saturated parts in its profile due to specular reflections, in which case a 1D variable may be some redness measure, or a blue-yellow coordinate, or a 1D composition of several color coordinates). Within the scope of the claims, the skilled person may also design multidimensional descriptors, but for simplicity we do not complicate this description with such information.

FIG. 6 shows a minimal user effort interface for repositioning ranges, which, for many users, will be all they need, since it allows for, e.g., the groom object to look just a little brighter—and hence nicer—in the final image Is compared to in the captured input image Io.

A subpicture 601 is shown on top of the captured picture (or whatever the camera currently displays). Therein, the range (or gamut) 624 of the output color space (e.g., 8 bit JPEG) is shown (the current capturing range of the sensor may also be shown). In the present example—perhaps by using bracketing—range 603 (O1) of the bride object (which is advantageously identified with a symbol 623, such as an iconified, e.g., posterized, small version of the object segment) and range 605 (O2) of the groom object are well imaged within the output color space of the output image Is. Advantageously, a grey scale 625 is also shown, so that the user Approximately—at least as far as the camera display 434 allows—can see to what grey values points in the range 624 correspond. The borders of the output gamut 624 are also indicated, with lines 611, and a symbol 612.

The transformation interface unit 450 is arranged to allow the user to modify the range of, e.g., the groom object, in case he thinks it is still too dark. A cursor 621 allows him to grab the range, and shift it upwards (brightness change of the object), or change one of the extreme points—e.g., lower bound Lo1—of a range (modifying the contrast within the object also). He will probably want to do that for the cat object range 607 (O3), which is currently under-exposed. The object transformation unit 414 may be arranged to do some automatic suggestions, and, via the user interface already present, to present to the user a first possibility of mapping the different objects, based on pre-determined algorithms for harmonious gamut mapping (in this case the user action, and hence the specification sp being the mathematical representation of his request being sent to the object transformation unit, may be very simple, like a few clicks to move a selected object range up- or downwards in grey value with predetermined steps).

Apart from showing the objects of interest, also indicators of the rest of the scene are shown, e.g., a part of the background. In the example, a part 608 of the background region is shown which shows over-exposure, by iconifying at least a part of the pixels which are too bright (range 609). This allows the user to modify the entire background region, or to define a further segment for correcting (everything outside the window) to a light, but within gamut range.

At the same time as modifying the color range of the selected object, the object transformation unit 414 is arranged to apply a modification to the colors of the rest of the image too, via an elasticity constant. For example, with an elasticity of 20%, if the brightness of the groom is increased by 10 units, the rest of the image objects and scene background is increased by 2 units (there may be further gamut mapping, so that, e.g., the brightest pixels of the bride are only changed by 1 unit to avoid clipping). An elasticity may be defined among a group of objects only (e.g., the bride and groom become lighter with one action, but not the rest of the picture). With an elasticity of 0%, an object can be modified independent of its surroundings. The object transformation unit 414 may further be arranged to apply the elastic color transformation of the other object colors with a geometric profile, typically only in the surround of the modified object (a circular profile is better than, e.g., a distance transform based on the object border-shaped profile). Hence, a center point is determined for the object to be modified (e.g., the centroid, or where the user clicked to segment the object). Pixels within the objects are normally modified according to a range-based modification, e.g., if the lower bound Lo1 of the bride range 603 is moved upwards to Lo1', points of color x within the object are changed according to:

$$x' = x + \frac{(Uo1 - x)}{(Uo1 - Lo1)}(Lo1' - Lo1) \qquad \text{[Eq. 1]}$$

in which x' is the new color and x the original color, and Uo1 is the original upper bound of the bride range 603, or another predefined function which acts more like a shift than a stretch, with another mapping profile over the range (the upper point staying fixed or becoming co-moving).

Points outside and in the vicinity of the bride object then are transformed according to:

$$x'=F(x,r)=G(x)H(r),\qquad[\text{Eq. 2}]$$

r being the distance of a point to the center point and the radial function H having, e.g., a Gaussian leveling-off shape.

This simulates lighting the bride with an additional spotlight, and it may make her more harmonious with the surround. The results of all modifications are immediately shown on the underlying final image.

In some cases, the object transformation unit 414 may perform some transformations on the captured image Io purely as a post-processing within the need of recapturing. In theory, this processing could then have been done equally well at home, although the user would then have lost all possibilities of recapturing an image in case he could not get any pleasing transformation result, e.g., because of irreparable highlights, noise, etc. (he could take a second holiday to Venice, but not ask the Queen to celebrate her twentieth birthday again; professional photographers solve this by taking lots of pictures, but in the quiet of their studio, it is still somewhat of a guess whether they have captured a really good photograph after some editing; the present invention increases this probability).

For other cases, a status determining unit 415 determines whether it is wise to—automatically, or request the user to—capture a further image, by taking into account the physics of the capturing and the desired end result. For example, the cat was badly imaged, which need not be a problem if the user wants to see it hidden in the dark. However, if he wants to boost its lightness, the noise and posterization will predominate, so it is better to capture a second image with an exposure corresponding to the intended range.

Thereto, a data link 485 between the status determining unit 415 and the capturing optimization unit 424 is present, which allows transmission of statistics of the final rendering of the selected object (e.g., average rendering grey value, etc.).

The segment tracking module 411 can help in the blending, e.g., it may re-color originally positioned patches of the cat in the first image with the color values of corresponding patches in the new image. Of course, preferably the imaging camera unit may also be arranged to request the user to capture a final image, which, in fact, may activate the optimized fast successive capturing of several images (according to the desired final rendering of the user).

There are different reasons for the user to segment objects, which correspond to modes of the analysis mode control unit 470. Mode DO, the dominant object mode, has already been described. One or several objects of interest are segmented, and then, e.g., the optimal capturing parameters (of the or at least one imaging) are calculated, so that at least these objects come out well (or the user can further modify their colors as explained with FIG. 6, perhaps even with a single, first capturing which was not so optimal for the dominant objects).

Another type of object is an outlier object, segmented after putting the camera in the OL mode. This can be, e.g., everything behind the window. The camera then excludes these object pixels when optimizing the exposure (i.e., all in-house objects are selected by cutting out the window object). Optionally a further capturing may be done for the window object, or the user may just transform the window pixels from a single capturing with the transformation interface unit 450 explained with FIG. 6.

A third mode is the corrective action mode CA. In this case, an object is badly exposed, e.g., the vase object 151, which was to close to bright light 150. At least some of its pixels have been clipped to white, instead of being the beautiful (and difficult) pinkish vase color. For such objects, it is advantageous to not just be able to adjust the range (although in many cases that would already be enough), but also have control over the spatial profile, since illumination has a spatial characteristic due to the positioning of the light, shape of the object, etc.

Thereto, a spatial modification unit 416 is optionally included. It has also different modes, selectable via spatial mode control unit 471.

One example of the EQ (equalize color) mode is illustrated with the aid of FIG. 7.

A first sub-window 701 shows color profiles of the captured dominant object, under a first high exposure E1 and second low exposure E2. Any algorithm may be applied to convert the different colors C (e.g., luminance Y, a color coordinate c, or some combination of them) in a two-dimensional region to a 1-D profile over a path-following coordinate x, e.g., preferably a (typically sinuous) largely monotonous path between the lightest and darkest region of the object, or a zig-zag path or whatever. Due to the closeness of the lamp 150 with the long shutter time, some of the object (region 770) has become over-exposed and clipped to white (or at least near-white pale-ish colors). In this example, the rest of the object may also be too bright, but at least shows discriminatable colors, but of high contrast. The high contrast (perhaps due to shadow on the side opposing the light) implies that in the underexposed second captured picture (profile E2), there are regions which are too dark (region 771). A user may want the vase to look nicely uniformly pinkish, i.e., of lesser contrast. He may first adjust the average color of the object (note that FIG. 7 shows an example of a color transformation which may be performed "within" the object entirely, i.e., without taking into account or modifying the surroundings, as possibly the average lightness of the object is not changed considerably, but rather its contrast, which simulates having it illuminated differently: with a softer rather than a harsh, shadowy illumination).

This can be done e.g. by the user moving a center color mathematically derived (e.g. the average of all colors, or a geometrical average also taking into account the geometrical position along the object, favoring the colors captured in the vicinity of the object's centroid) by the spatial modification unit 416 to a new position 705 (perhaps he wants on average a lighter color). To determine the contrast along the object, he will typically also give one color-span indication, e.g. by inputting what value U' of the lightest color should be (end point 707). The other end point 708 may be derived mathematically, or also user-determined. The simplest representative of the desired profile variation F is a straight line (along which the real variability of the pixel colors will be mapped), but it can also be a more complicated function, as described below.

Sub-window 751 shows the final rendering result of the object, preferably also with some surrounding pixels. All the actually imaged pixels (e.g. of the second capturing) are mapped to the new lesser contrast profile, retaining the relative color variability, e.g. with a function like:

$$C' = M + \frac{U'-M}{Uo-M}(C-M),\qquad[\text{Eq. 3}]$$

in which M is some central color (e.g., the average of all colors) and Uo is the original lightest color, and C' is any pixel color after transformation.

More complex functions may be applied, taking into account a geometry of the object (e.g., pre-assuming a slight cylindrical shape).

The spatial modification unit 416 is arranged to determine which of the two captured images is best used (e.g., for the high x values, E2 has only noisy or dark-clipped values, hence the first image is best used), and even if, according to the user's desire, it is best to capture a further image (e.g., since the user wants the darker parts to become quite light, it is best to make a light exposure of this region). This again illustrates the advantage of the present invention. The user can, on the fly, always for each selected object (or non-ideality) in the image, give its preferences, and the camera can then still take all required actions to arrive at the most perfect picture given the physical constraints.

The user may also want to shape the profile (i.e. how the color dynamics evolve in the image plane) in a more intricate way, e.g. he may want a nice uniform pink for most of the vase, yet make some dark shadows. He can then introduce a further selection point 721, and e.g. change the slope of the darker regions, beyond 721.

To see what part of the image the values correspond to—and in particular the inappropriate values—a cursor 711 allows the user to select an x or corresponding C value along any of the curves, and a window 761 shows which part of the object correspond to the desired color (typically a few color values above and below the selected one). In the example a shadow patch 763 on the vase is shown, for which the user may accept bad imaging, as it is of little interest to him.

Similarly, the user can position another cursor 712 on the image for selecting parts of the profile he may want to change, since this is more intuitive for him. Cursor 711 is then co-positioned automatically.

Apart from applying a softer profile, creating an enhanced shadow effect may also be applied by switching to mode SE (shadow enhance). This is illustrated symbolically in FIG. 8. The spatial modification unit 416 then comprises a shading determining unit 417, arranged to determine whether a shadow (in general gradient) profile is present, and pre-defined properties such as at least its direction. An edge detector may be used to discriminate between large jumps (such as to the dark interior of the vase) and smooth gradients, and select only the gradient subregion for further processing. The shading is in general 2-dimensional (region 803), but for simplicity we explain a one-dimensional profile. The vase gradient consists of regions 80, 802, 803 (e.g. region 801, which may be shown as all pixels within luminance g+−e, e being a tolerance) of varying luminance, from a lightest to a darkest luminance Y0. Again an original profile 850 may be constructed, e.g. along the dominant gradient 805, which may be shown to the user (FIG. 8.2) alongside the shaded object itself. In the simplest interface the user simply scales this profile by pulling on the cursor 853 and/or 855 to obtain a final profile 851. More advanced profiles may be applied—preferably largely with automatic algorithms so that the interface to the user stays equally simple—which e.g. round-off the scaling towards the color extremes, or towards the geometrical extremes of the object (border patch 811) or depending on how far pixels are from the dominant direction and/or object border (orthogonal vector 813).

Further spatial profiles may be applied not solely within an object but to relate it with the surrounding pixels. Mode MB (merge background) interpolates the values of the outer object pixels and the surrounding pixels according to some interpolation profile.

Mode EB (emboss) strengthens the difference with the surrounding (e.g., by applying a slight upwards rolling within the object and downwards rolling in a darker surround, with in between a gradient) to make the object pop-out, as if by illumination.

Many further spatial profiles may be applied.

It is to be understood that although, for simplicity, the processing above was described linearly, representation space gamma, human visual models, and other color modeling will be taken account in the transformation, the user simply having to drag and look at the result.

In the above we have mainly discussed the present invention for changing the luminance (grey values) of imaged object pixels, but the same principles can be applied for other color properties, e.g. correcting an object which is e.g. too bluish (because it is too near a window) to make it more yellow in conformity with the incandescently illuminated objects in the scene. Therefore we have used the generic wording color. The automatic white balancing is in this respect similar (both optimally mapping towards a desired final representation gamut), and in fact the three color channels are on their own mono-chromatic.

The algorithmic components disclosed in this text may in practice be (entirely or in part) realized as hardware (e.g., parts of an application specific IC), or as software running on a special digital signal processor, or a generic processor, etc.

The term "computer program product" should be understood to include any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a non-transitory computer-readable storage medium, such as, e.g., a disk or tape, data present in a memory, or as data traveling over a network connection—wired or wireless—, or program code on paper. Apart from program code, characteristic data required for the program may also be embodied as a computer program product.

Typically, the imaging camera unit is built into the camera, but it may be in a separate part, such as, e.g., a plug-in card comprising an image processing ASIC.

Some of the steps required for the working of the method may be already present in the functionality of the processor instead of described in the computer program product, such as data input and output steps.

It should be noted that the above-mentioned embodiments illustrate rather than limit the invention. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An imaging camera unit, arranged to form part of an image-capturing camera system, comprising:
   a user-interface for specifying at least one indication of a geometric position of an object of user preference in a captured image received from an imaging sensor via an input;
   a user-adaptable object segmentation unit for determining a set of pixels being part of the object based on the indication;
   a color composition monitor unit for determining at least one statistic based on at least one color property of pixels in the set of pixels;
   an object transformation unit for applying a transformation to the at least one color property of the pixels in the set of pixels and applying a different transformation to at least one color property of pixels outside the set of pixels based on a user specification of a user supplied to the object transformation unit via a transformation interface unit; and
   a capturing optimization unit configured to capture an under-exposed image of the object and an over-exposed image of the object, display the under-exposed image, the over-exposed image of the object and a plot of image parameters versus position, wherein positioning a first cursor on an image position one of the under-exposed image and the over-exposed image automatically displays a second cursor on the plot at a plot position corresponding to the image position.

2. The imaging camera unit as claimed in claim 1, wherein the object transformation unit is arranged to apply the different transformation via an elastic color transformation in dependence on the transformation to the at least one color property of the pixels in the set of pixels.

3. The imaging camera unit as claimed in claim 2, wherein the object transformation unit is arranged to apply the elastic color transformation with a geometric profile.

4. The imaging camera unit as claimed in claim 1, wherein said imaging camera unit further comprises a capturing optimization unit arranged to optimize at least one capturing parameter for capturing at least one further image.

5. The imaging camera unit as claimed in claim 4, wherein the at least one capturing parameter belongs to a set of shutter speed, aperture, amplification factor, contrast adjustment, color temperature correction, and color cast removal.

6. The imaging camera unit as claimed in claim 1, wherein the object transformation unit and the transformation interface unit are arranged to specify a range of grey values of the pixels in the set of pixels of the object.

7. The imaging camera unit as claimed in claim 6, wherein the transformation interface unit is arranged to display a composition picture comprising at least two different objects and at least two scales for independently changing properties of pixels of the at least two different objects in the captured image.

8. The imaging camera unit according to claim 1, wherein said imaging camera unit further comprises a spatial modification unit arranged to modify a geometrical profile of the at least one color property of the set of pixels of the object based on the user specification.

9. The imaging camera unit as claimed in claim 1, wherein said imaging camera unit further comprises a status determining unit arranged to determine whether capturing of a further image is required depending on a final image look determined by the user.

10. The imaging camera unit as claimed in claim 8, wherein the spatial modification unit is arranged to reduce spread of values of the at least one color property of the set of pixels of the object.

11. The imaging camera unit as claimed in claim 1, wherein the at least one indication of a geometric position of the object comprises a specification of an outline of the object.

12. The imaging camera unit of claim 1, wherein the transformation changes contrast in the set of pixels of the object without changing an average lightness of the pixels in the set of pixels of the object.

13. The imaging camera unit of claim 1, wherein the transformation reduces contrast in the set of pixels of the object while retaining a relative color variability among pixels in the set of pixels of the object.

14. A still-picture or video camera, comprising:
   an imaging camera unit comprising:
      a user-interface for specifying at least one indication of a geometric position of an object of user preference in a captured image received from an imaging sensor via an input;
      a user-adaptable object segmentation unit for determining a set of pixels being part of the object based on the indication;
      a color composition monitor unit for determining at least one statistic based on at least one color property of pixels in the set of pixels;
   an object transformation unit for applying a transformation to the at least one color property of the pixels in the set of pixels and applying a different transformation to at least one color property of pixels outside the set of pixels based on a specification of a user supplied to the object transformation unit via a transformation interface unit; and
   a capturing optimization unit configured to capture an under-exposed image of the object and an over-exposed image of the object, display the under-exposed image, the over-exposed image of the object and a plot of image parameters versus position,
   wherein positioning a first cursor on an image position one of the under-exposed image and the over-exposed image automatically displays a second cursor on the plot at a plot position corresponding to the image position, and
   wherein the imaging sensor is connected to the imaging camera unit.

15. A method of determining in a camera at least one statistic of at least one color property of pixels of an object in a picture captured by an imaging sensor of the camera, said method comprising the acts of:
   specifying at least one indication of a geometric position of the object in the captured image;
   determining a set of pixels being part of the object based on the indication;
   determining the at least one statistic based on the at least one color property of pixels in the set of pixels;
   based on a user supplied specification, applying a first transformation to the at least one color property of the pixels in the set of pixels specification and applying a second different transformation to at least one color property of pixels outside the set of pixels; and
   capturing by a capturing optimization unit an under-exposed image of the object and an over-exposed image of the object, display the under-exposed image, the over-exposed image of the object and a plot of image parameters versus position, wherein positioning a first cursor on an image position one of the under-exposed image and the over-exposed image automatically displays a second cursor on the plot at a plot position corresponding to the image position.

16. The method as claimed in claim 15, wherein the second different transformation is applied via an elastic color transformation in dependence on the transformation to the at least one color property of the pixels in the set of pixels.

17. The method as claimed in claim 16, wherein the elastic color transformation is applied with a geometric profile.

18. A non-transitory computer-readable storage medium having stored thereon a computer program for determining in a camera at least one statistic of at least one color property of pixels of an object in a picture captured by an imaging sensor of the camera, the computer program enabling a processor to execute the acts comprising:

specifying at least one indication of a geometric position of the object in the captured image;

determining a set of pixels being part of the object based on the indication;

determining the at least one statistic based on the at least one color property of pixels in the set of pixels;

based on a user supplied specification, applying a first transformation to the at least one color property of the pixels in the set of pixels specification and applying a second different transformation to at least one color property of pixels outside the set of pixels; and capturing by a capturing optimization unit an under-exposed image of the object and an over-exposed image of the object, display the under-exposed image, the over-exposed image of the object and a plot of image parameters versus position, wherein positioning a first cursor on an image position one of the under-exposed image and the over-exposed image automatically displays a second cursor on the plot at a plot position corresponding to the image position.

* * * * *